United States Patent
Waisanen et al.

(10) Patent No.: US 10,298,978 B2
(45) Date of Patent: May 21, 2019

(54) INTEREST PREDICTION

(71) Applicant: DISH Technologies L.L.C., Englewood, CO (US)

(72) Inventors: Hayden Waisanen, Deadwood, SD (US); Nicholas B. Newell, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 424 days.

(21) Appl. No.: 13/763,319

(22) Filed: Feb. 8, 2013

(65) Prior Publication Data
US 2014/0229964 A1    Aug. 14, 2014

(51) Int. Cl.
| | |
|---|---|
| *H04N 21/25* | (2011.01) |
| *H04N 21/45* | (2011.01) |
| *H04N 21/442* | (2011.01) |
| *H04N 21/466* | (2011.01) |
| *H04N 21/475* | (2011.01) |

(52) U.S. Cl.
CPC ..... *H04N 21/251* (2013.01); *H04N 21/44222* (2013.01); *H04N 21/4532* (2013.01); *H04N 21/466* (2013.01); *H04N 21/475* (2013.01)

(58) Field of Classification Search
CPC combination set(s) only.
See application file for complete search history.

(56) References Cited

U.S. PATENT DOCUMENTS

| | | | |
|---|---|---|---|
| 7,028,327 B1* | 4/2006 | Dougherty | H04N 7/17318 348/E7.071 |
| 7,478,414 B1* | 1/2009 | Glusker et al. | 725/9 |
| 2009/0165044 A1 | 6/2009 | Collet et al. | |
| 2009/0178083 A1* | 7/2009 | White | H04N 5/44543 725/61 |
| 2009/0183210 A1* | 7/2009 | Andrade | G06F 17/30817 725/87 |
| 2010/0146559 A1 | 6/2010 | Lee et al. | |
| 2010/0319015 A1* | 12/2010 | Remington | H04H 20/10 725/19 |
| 2011/0035462 A1* | 2/2011 | Akella | H04N 7/163 709/217 |
| 2012/0054610 A1* | 3/2012 | Archer | H04N 21/254 715/716 |
| 2012/0204201 A1* | 8/2012 | Cassidy | H04N 21/258 725/10 |
| 2013/0205311 A1 | 8/2013 | Ramaswamy et al. | |
| 2013/0239136 A1 | 9/2013 | Babu et al. | |

(Continued)

OTHER PUBLICATIONS

U.S. Appl. No. 14/631,412, filed Feb. 25, 2015 Non Final Rejection dated Jan. 20, 2016, all pages.

(Continued)

*Primary Examiner* — Alexander Gee
(74) *Attorney, Agent, or Firm* — Kilpatrick Townsend & Stockton LLP

(57) ABSTRACT

System and methods for providing access to particular media content. First media content may be output for presentation by a display device. Second media content other than the first media content may be monitored. A determination may be made as to whether the second media content has a priority greater than the first media content. Access to the second media content for presentation by the display device may be provided.

20 Claims, 7 Drawing Sheets

(56) References Cited

U.S. PATENT DOCUMENTS

2013/0346144 A1* 12/2013 Ferren .................. G06K 9/3266
705/7.29
2014/0172429 A1* 6/2014 Butcher ................ G10L 19/018
704/270
2016/0029054 A1 1/2016 Waisanen et al.

OTHER PUBLICATIONS

U.S. Appl. No. 14/631,412, filed Feb. 25, 2015 Final Rejection dated Aug. 19, 2016, all pages.
U.S. Appl. No. 14/631,412, filed Feb. 25, 2015 Non-Final Rejection dated Jun. 23, 2017, all pages.

* cited by examiner

Priority Listing 172
Manually Edit Priorities

| Priority | Content |
|---|---|
| 1. | New episodes of Futurama  130  "swap" |
| 2. | Shows about cars |
| 3. | News about severe weather |
| 4. | CNN (7 AM - 9 AM; Monday-Friday) |
| 5. | Cartoons (9 AM - Noon; Saturdays) |
| | . . . |

FIG. 4

INTEREST PREDICTION

BACKGROUND

The ever-increasing amount and diversity of electronic media content may allow consumers the flexibility to access various content of interest. It may be difficult, however, for consumers to identify content of particular interest from a vast amount of available content.

SUMMARY

This Summary does not in any way limit the scope of the claimed subject matter.

In an aspect, a method for providing access to particular media content is disclosed. The method may include outputting first media content for presentation by a display device. The method may further include monitoring second media content other than the first media content. The method may further include determining that the second media content has a priority greater than the first media content. The method may further include providing access to the second media content for presentation by the display device.

In an aspect, a television receiver is disclosed. The television receiver may include a first module configured to output first media content to a display device for presentation by the display device, and to at least provide access to second media content for presentation by the display device. The television receiver may further include a second module configured to analyze the second media content, when the first media content is output to the display device, and determine whether the second media content has a priority greater than the first media content.

In an aspect, a computing device including at least a processing unit and a system memory connected to the processing unit. The system memory may include instructions that, when executed by the processing unit, cause the processing unit to implement at least one module to provide access to particular media content. The at least one module may be configured to output first media content for presentation by a display device. The at least one module may further be configured to monitor second media content other than the first media content. The at least one module may be further configured to determine whether the second media content has a priority greater than the first media content. The at least one module may further be configured to provide access to the second media content for presentation by the display device.

BRIEF DESCRIPTION OF THE DRAWINGS

A further understanding of the nature and advantages of various embodiments may be realized by reference to the following figures. In the appended figures, similar components or features manual may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

FIG. 4 shows an example priority listing in accordance with the present disclosure.

DETAILED DESCRIPTION

The present disclosure is directed to systems and methods for presenting or exposing certain media content to a user based on an interest prediction. Such an implementation may comprise of at least three features in accordance with the present disclosure: interest gathering; channel analysis; and recommendation offering. In general, interest gathering may correspond to the compilation of input, both explicitly and implicitly, from a user to determine a detailed list of that user's viewing preferences. Such preferences may include, for example, favorite channels, events, series, actors, directors, times of day, days of the week, movies, sports teams, genres, topics, geographical locations, and etc. Channel analysis may correspond to the continuous scanning of subscribed channel offerings to identify current and upcoming events that are most likely to be enjoyed by the user based on the users' detailed interests. Subsequently, a comparison may be made of an identified program(s) to the portion of the program(s) that the user is currently watching to identify whether an "interest vacuum" exists. An "interest vacuum" may exist when there is a program on another channel that a user may prefer to watch over what the user is currently watching. Recommendation offering may correspond to using results of the channel analysis and deciding whether to offer a different program to the user, taking into account user settings and previous responses to recommendations. In this manner, "recommendation offering" may be similar to an "interest prediction."

The ability to make an "interest prediction" may be performed by analyzing the wealth of information that can be found within viewing history of a particular user. Certain patterns in viewing habits may be found in how this data is sorted. For example, when a sort is performed based on the times (e.g., from 7 PM to 10 PM) that programs are watched, by looking at max/min of the data, a prediction may be made to understand when a particular user is more or less likely to be watching television. A similar analysis may be performed by sorting content by genre. Here, a prediction may be made as to the type of content the particular user is interested in. In general, an assumption may be made that, when a user is watching a channel or a show, the user is at least partially interested in the show. A degree to which the user is interested in the show may be proportional to the amount of time that the content is viewed. For example, a higher "interest" confidence may be assigned to content that is watched in its entirety, as opposed to content that is only partially watched such as half of the content.

Figure 1:
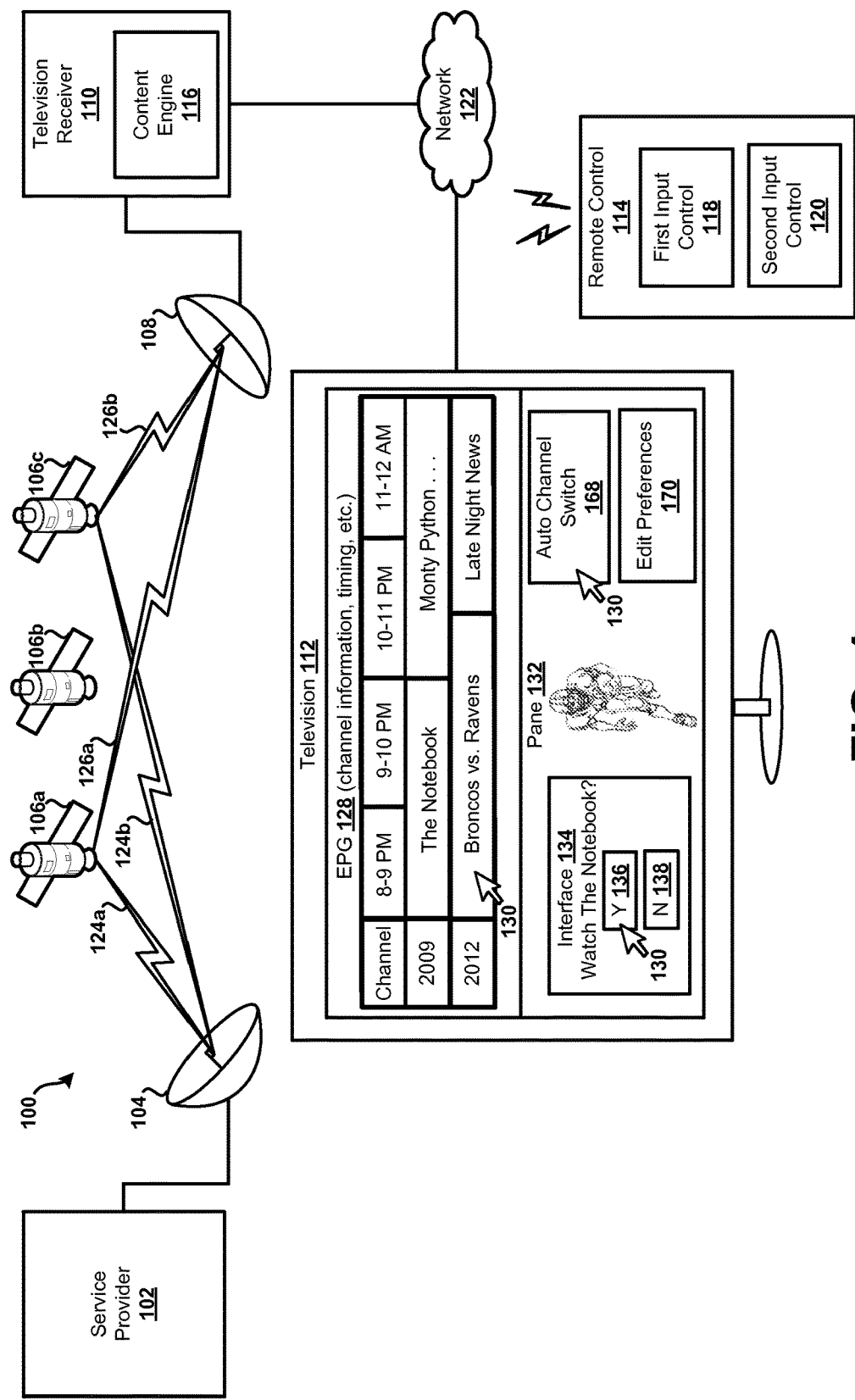
FIG. 1 shows an example media content distribution system in which aspects of the present disclosure may be implemented.

FIG. 1 shows an example media content distribution system 100 in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation specific, and at least some of the aspects of the system 100 may be similar to a cable television distribution system, or other type of media or content distribution system. Further, the "television receiver" as described throughout may be any type of television receiver, such as a set-top-box for example. In another example, the "television receiver" may correspond to functionality integrated into a television, a digital video recorder, a tablet, or any other computing system or device, and variations thereof. Additionally, features and concepts as discussed throughout the present disclosure may be applicable to any type or form of networked computing system environment, and may not be limited to a satellite television system implementation, a cable television system implementation, or other particular implementation.

The example system 100 may include a service provider 102, a satellite uplink 104, a plurality of orbiting (e.g., geosynchronous) satellites 106(*a-c*), a satellite dish 108, a television receiver 110, a television 112, and a pointing device 114. In the present example, the television receiver 110 may at least include content engine 116, and the pointing device 114 may at least include a first input control 118 and a second input control 120. As discussed in further detail below, the content engine 116, together with other elements of the example system 100, may be configured to present or expose certain media content to a user based on an interest prediction. Additionally, in one embodiment the first input control 118 and/or a second input control 120 may comprise of a depressible button incorporated within or on the pointing device 114. Other embodiments are however possible. For example, it is contemplated that the first input control 118 and/or a second input control 120 may be configured to support any type of HMI (Human-Machine Interaction). One example of such an implementation may include VIC (Voice Input Control). Still other embodiments are possible.

The system 100 may also include at least one network 122 that establishes a bi-directional communication path for data transfer between the television receiver 110 and the television 112. In some embodiments, the network 122 may further establish a bi-directional communication path for data transfer between the television receiver 110 and the service provider 102 (not shown). In general, the network 122 may incorporate or exhibit any number of terrestrial and/or non-terrestrial network features or elements. For example, the network 122 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, or other any type of communication network(s) configured such that data may be transferred among respective elements of the example system 100.

The television receiver 110, together with the television 112 and the network 122, may form at least a portion of a particular home computing network, and may each be respectively configured such as to enable communication(s) in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), and others.

In practice, the satellites 106 may be configured to receive uplink signals 124(*a-b*) from the satellite uplink 104. In this example, the uplink signals 124 may contain one or more transponder streams of particular data or broadcast content (e.g., a particular television channel) that is supplied by the service provider 102. For example, each of the respective uplink signals 124 may contain various encoded HD (High Definition) television channels, various SD (Standard Definition) television channels, on-demand programming, programming information, and/or any other content in the form of at least one transponder stream and in accordance with an allotted carrier frequency and bandwidth. In this example, different television channels may be carried using different ones of the satellites 106. Different television channels may also be carried using different transponders of a particular satellite (e.g., satellite 106*a*); thus, such television channels may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, etc.

The satellites 106 may further be configured to relay the uplink signals 124 to the satellite dish 108 as downlink signals 126(*a-b*). Similar to the uplink signals 124, each of the downlink signals 126(*a-b*) may contain one or more transponder streams of particular data or broadcast content, such as various encoded and/or electronically scrambled television channels, on-demand programming, etc., in accordance with an allotted carrier frequency and bandwidth. The downlink signals 126, however, may not necessarily contain the same content as a corresponding one of the uplink signals 124. For example, the uplink signal 124*a* may include a first transponder stream containing at least a first group of television channels, and the downlink signal 126*a* may include a second transponder stream containing at least a second, different group of television channels. In other examples, the first and second group of television channels may have one or more television channels in common. In sum, there may be varying degrees of correlation between the uplink signals 124 and the downlink signals 126, both in terms of content and underlying characteristics.

Continuing with the example implementation-specific scenario, the satellite dish 108 may be provided for use (e.g., on a subscription basis) to receive television channels provided by the service provider 102, satellite uplink 104, and/or satellites 106. For example, the satellite dish 108 may be configured to receive particular transponder streams, or downlink signals (e.g., downlink signals 126), from the satellites 106. Additionally, the television receiver 110, which is communicatively coupled to the satellite dish 108, may subsequently select via tuner (not shown), for example, and relay particular transponder streams to the television 112 for display thereon as desired. For example, the satellite dish 108 and the television receiver 110 may, respectively, be configured to receive and relay at least one premium HD-formatted television channel to the television 112. In this example, the premium HD channel may be output to the television 112 from the television receiver 110 in accordance with the HDMI/HDCP content protection technologies.

In example embodiments, the television receiver 110 may be configured to output a plurality of interfaces to the television 112. For example, as shown in FIG. 1, the television receiver 110 may be configured to output an EPG (Electronic Programming Guide) 128 to the television 112. The EPG 128 may at least present various information related to television channels and the timing of programs or programming appearing on such television channels (e.g., as received from satellites 106). For example, the EPG 128 may at least display channel information associated with a channel "2009," where in the present example a movie, "The Notebook," is listed as scheduled to appear on the channel "2009" during a particular time period "8-10 PM" of a particular day, etc.

The EPG 128 may at least further display channel information associated with a channel "2012," where in the present example a sporting event "Broncos vs. Ravens" is listed as scheduled to appear on the channel "2012" during a particular time period "8-10:30 PM." In this example, and assuming that a "current" time is sometime during the particular time period "8-10:00 PM," a user may manipulate a cursor 130 using the pointing device 114 to select "The Notebook," or the "Broncos vs. Ravens," for immediate viewing on the television 112. For example, the user may manipulate the cursor 130 using the pointing device 114 to select the "Broncos vs. Ravens" via actuation of the first input control 118, in accordance with a "point and click" gesture or action. Other embodiments are possible.

In this example, and for purpose of discussion, the "Broncos vs. Ravens" is intended to be shown as "playing" within a pane 132 on the television 112. Here, the "Broncos vs. Ravens" broadcast may have been selected, for example, for display within the pane 132 on the television 112 during a break in broadcast, such as a commercial break, of "The Notebook" as appearing on channel "2009." In one example, the content engine 116 of the television receiver 110 may be configured to initially estimate or otherwise determine that "The Notebook" is likely or probably of greater importance or priority to one or more users viewing the "Broncos vs. Ravens" as "playing" within the pane 132 on the television 112. In general, this may be performed prior to a resuming in broadcast, such as prior to the end of the commercial break, of "The Notebook" as appearing on channel "2009."

In other words, the content engine 116 may determine that someone watching the "Broncos vs. Ravens" may in fact be more interested in watching "The Notebook." The content engine 116 may then output within the pane 132 an interface 134 requesting input as to whether a potentially interested user would like to "Watch The Notebook?" The user(s) may then optionally select, or not, "The Notebook" for immediate viewing on the television 112. For example, the user may manipulate the cursor 130 using the pointing device 114 to select a confirmation button 136 to select "The Notebook" for immediate viewing on the television 112. In another scenario, the user may manipulate the cursor 130 using the pointing device 114 to select a disregard button 138 to decline the option for immediate viewing of "The Notebook." In event of selection of the confirmation button 136, "The Notebook" may be displayed within the pane 132 for immediate viewing, otherwise the "Broncos vs. Ravens" may be continued to be displayed.

In the above example, the content engine 116 may be understood to present or expose certain media content to a user based on an interest prediction. For example, in one embodiment, the content engine 116 may substantially monitor all broadcast content received by the television receiver 110, and present or expose certain media content to the user in view certain profile information associated with the user, or an account associated with the user, such as an customer account used by the service provider 102 to bill for provided services.

Figure 2:
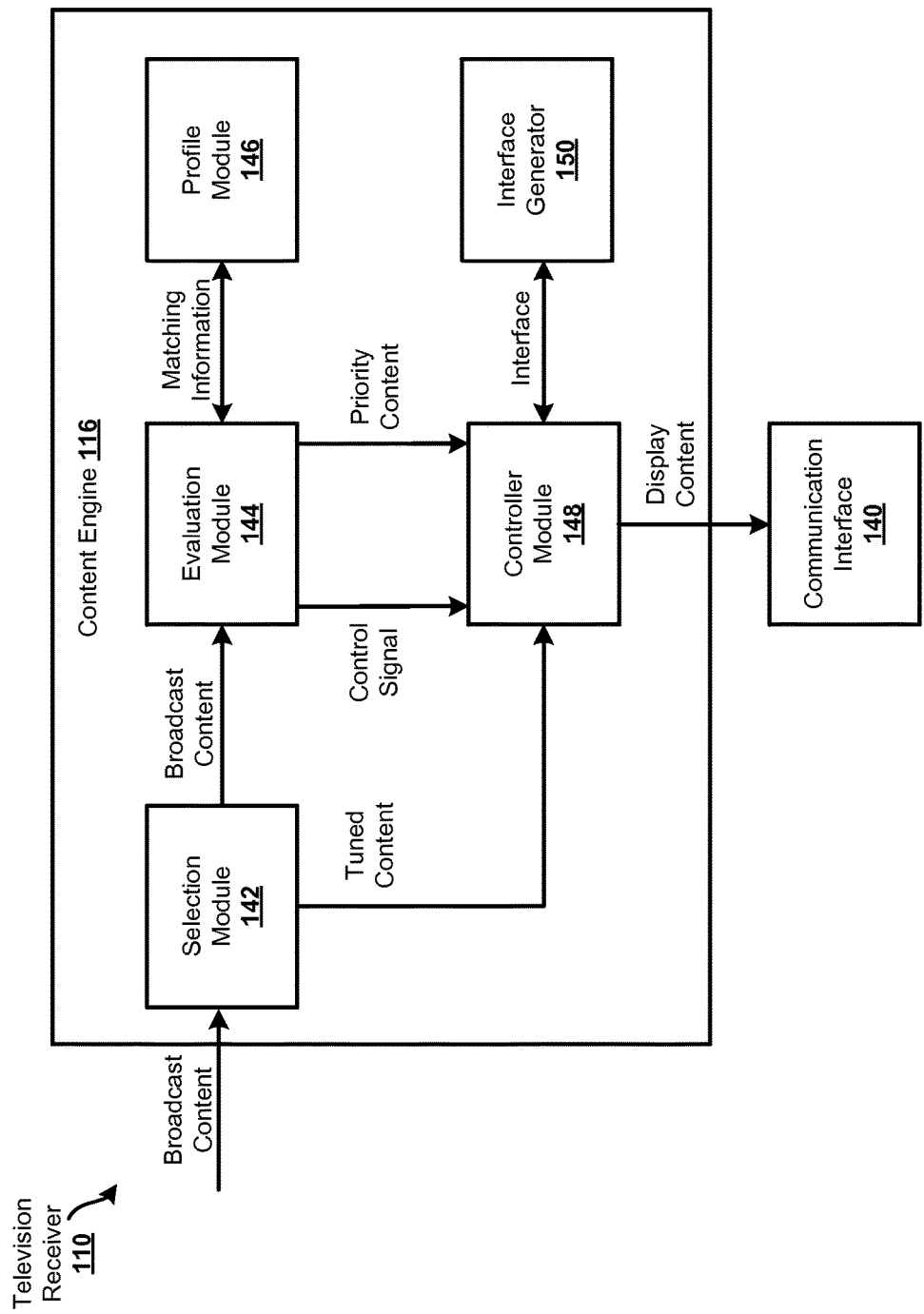
FIG. 2 shows an example block diagram of a television receiver of FIG. 1.

For example, referring now to FIG. 2, a block diagram of the television receiver 110 of FIG. 1 is shown. In particular, the television receiver 110 may include the content engine 116 and a communication interface 140. For brevity, the television receiver 110 is depicted in a simplified and conceptual form, and may generally include more or fewer elements or components as desired. For example, the television receiver 110 may be configured to include any number of other various components or logical modules that are implemented in hardware, software, firmware, or any combination thereof, and such components or logical modules may or may not be implementation-specific.

For example, the television receiver 110 may in certain implementations be configured to include one or more tuners, one or more network interfaces, at least one NIT (Network Information Table), one or more other DVR (Digital Video Recorder)-related components, at least one demultiplexer, at least one smart card, at least one descrambling engine, and other various modules or components consistent with, for example, at least one of a set-top-box implementation, a television implementation, a DVR implementation, a tablet computer implementation, or any other computing system or device implementation. Still other variations of the television receiver 110 are possible. For example, the television receiver 110 may include one or more logical modules configured to implement a TV steaming media functionality that encodes video into a particular format for transmission over the Internet such as to allow users to remotely view and control a home cable, satellite, or personal video recorder system from an Internet-enabled computer with a broadband Internet connection.

In the present example, the content engine 116 may include a selection module 142, an evaluation module 144, a profile module 146, a controller module 148, and an interface generator 150. Other embodiments are possible. For example, the content engine 116 may generally include more or fewer modules configured to implement one or more aspects of the present disclosure. For example, one or more modules of the content engine 116 may be wholly or at least partially incorporated within one or more other modules of the content engine 116. Further, one or more modules of the content engine 116 may be wholly or at least partially incorporated within one or more other special-purpose computing systems or devices within the example system 100. For example, one or more modules of the content engine 116 may be wholly or at least partially incorporated within or on the service provider 102 and/or the television receiver 110 of FIG. 1. Still other embodiments are possible.

The communication interface 140 of the television receiver 110 may be configured to enable the transfer of data or information with and between compatibly configured devices via multiple different communication channels, and types of communication channels, some of which may be implementation specific. For example, the communication interface 140 may be configured to communicate or otherwise exchange information with the television 112 over the network 122. In another example, while a primary communication channel may exist between the television receiver 110 and the service provider 102 via satellites 106 (which may be unidirectional to the television receiver 110), the communication interface 140 may be configured to communicate or otherwise exchange information with the service provider 102 over a network (not shown) established between the television receiver 110 and the service provider 102, similar to the network 122. In still another example, the communication interface 140 may be configured to communicate or otherwise exchange information with any type or variety of peripheral computing device such as, for example, a USB (Universal Serial Bus) device, removable memory card, smartphone device, video game console, and many others.

In practice, the selection module 142 may receive "broadcast content." For example, the selection module 142 may receive various television channels as provided by the service provider 102, satellite uplink 104, and/or satellites 106, via the satellite dish 108, as described above in connection with FIG. 1. Upon receipt of the broadcast content, the selection module 142 may select and pass "tuned content" to the controller module 148. For example, the selection module 142 may pass audio/video content associated with the sporting event "Broncos vs. Ravens" to the controller module 148, following user-selection of this programming for display on the television 112 using the pointing device 114.

The selection module 142 may additionally select and pass the broadcast content to the evaluation module 144. Upon receipt of the broadcast content, the evaluation module 144 may extract and analyze various metadata associated with the broadcast content. For example, and as described in further detail below in connection with FIG. 3, the evaluation module 144 may extract and analyze various "tags" associated with "The Notebook," where a particular tag may specify, for example, content title: "The Notebook," showing time: "8-10 PM," leading actress: "Rachel McAdams," scheduled commercial start/end times, and many other types of metadata associated with the movie "The Notebook."

Upon extraction and analysis of metadata associated with the broadcast content, the evaluation module 144 may query the profile module 146 and compare the metadata associated with the broadcast content with particular preference and/or priority information. This particular preference and/or priority information may be associated with at least one user or user account associated with the television receiver 110. When a preference and/or priority with respect to particular content of the broadcast content is established or identified, referred to as "matching information" within FIG. 2, the evaluation module 144 may select and pass "priority content," along with a "control signal" indicating presence of the priority content, to the controller module 148.

As described in further detail below in connection with FIG. 3, the control signal may further indicate whether an "automatic" channel switch to the priority content is to be performed by the content engine 116, or if an interface (e.g., interface 134) requesting input as to whether a potentially interested user would like to watch the priority content is to be output to television 112. In the present example, it is assumed the control signal further indicates that an interface requesting input as to whether a potentially interested user would like to watch the priority content is to be output to television 112.

For example, the evaluation module 144 may query the profile module 146 and determine that, based on identified matching information, at least one user or user account associated with the television receiver 110 is at least probably, or likely, interested in movies starring leading actress "Rachel McAdams." The evaluation module 144 may then pass audio and/or video of "The Notebook" the priority content, along with the control signal, to the controller module 148. The controller module 148 may then query the interface generator 150 to retrieve data associated with an interface that specifies "The Notebook" is nearly, or currently, available for viewing. The interface may at least support user input as to whether a potentially interested user would like to watch "The Notebook." For example, the controller module 148 may retrieve data associated with the interface 134 of FIG. 1.

Upon receipt of the data associated with the interface, the controller module 148 may pass "display content" to the communication interface 140. The communication interface 140 may subsequently pass the display content to the television 112 for display on the television 112. In the present example, the display content may comprise of the tuned content along with the interface. For example, the communication interface 140 may pass audio/video content associated with the "Broncos vs. Ravens," along with the interface 134, to the television 112 for display on the television 112. A user may then optionally select, or not, "The Notebook" for immediate viewing on the television 112. Other embodiments are possible.

As discussed above, the evaluation module 144 may extract and analyze metadata associated with broadcast content as received by the evaluation module 144. In particular, the evaluation module 144 may extract and analyze one or more tags associated with broadcast content as received by the evaluation module 144. Referring now to FIG. 3, the content engine 116 of FIG. 2 is shown in further detail. In particular, FIG. 3 shows the evaluation module 144, profile module 146, and controller module 148 of the content engine 116.

Continuing with the example implementation-specific scenario of FIG. 1, the broadcast content as received by the evaluation module 144 may at least include a stream or sequence of video data packets corresponding to multiple television channels. Among a plurality of other information, each respective video packet may contain a PID (Packet Identifier) that may identify or otherwise associate a particular packet with particular content and a particular television channel. For example, a particular video packet 152 of the stream or sequence of video data packets as received by the evaluation module 144 may be associated with "The Notebook," and channel "2009." Each video packet may further include a plurality of tags encoded within the video packet that describe content within the video packet.

In particular, the plurality of tags may include or specify any conceivable type of aspect or attribute of content within a particular packet (e.g., video packet 152) including, but not limited to: Show Title; Showing Time; Original Air Date/Time, which may be used to determine whether a particular show is a re-run; Genre, such as comedy, drama, action, horror, news, etc.; General Key Words, such as, for example, for a presidential debate, "debate," "2012 elections," "Obama," "Romney," "Republican," "Democrat," "politics," "foreign policy," and etc., where such keywords may be taken as a whole, or at least in part, and may embody topics covered in the show; Real Time Keywords, which may be useful for news stations, such as, for example, "from 37 to 43," "healthcare," "ObamaCare," "individual mandate," "pre-existing conditions," "politics," based on knowledge that "CNN is going to cover healthcare bill from 37 to 43 minutes into the broadcast."

Additionally, Real Time Keywords might be segmented according to "type" such as, for example, "people" type, "topic" type, "location" type, and others. This may not only allow a customer to refine keyword searches, but may also allow the television receiver 110 to tailor a suggestion according to an importance placed on each "type." Many other metadata or tags are possible as well. Additionally, and as described in further detail below, information associated with such tags within a particular video packet may be compared with preference and/or priority information associated with at least one user or user account, and may be used to quantify or otherwise estimate potential user interest in video content within a particular video packet.

Figure 3:
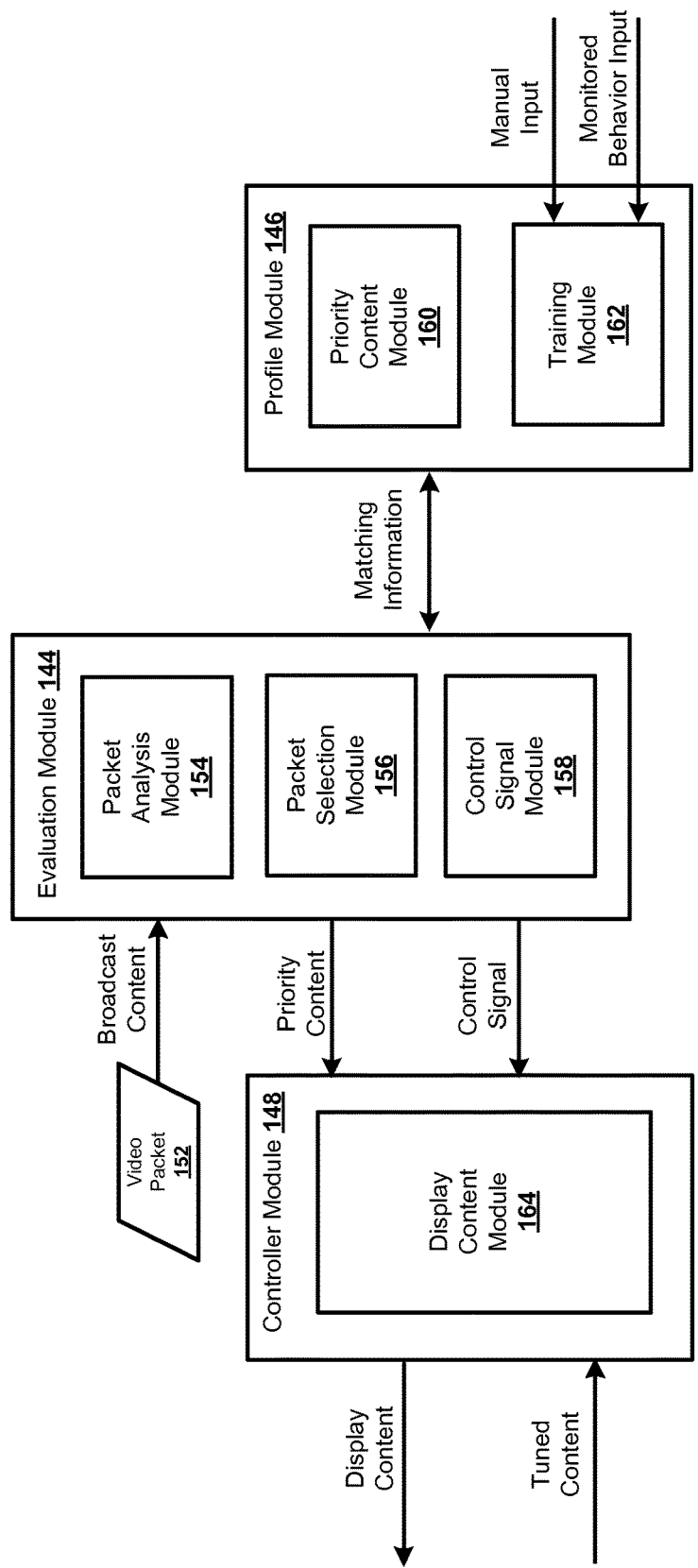
FIG. 3 shows an example block diagram of a content engine of FIG. 2.

In the example of FIG. 3, the evaluation module 144 may include a packet analysis module 154, a packet selection module 156, and a control signal module 158. The profile module 146 may include a priority content module 160 and training module 162. The controller module 148 may include a display content module 164. Other embodiments are possible. For example, one or more modules of at least one of the evaluation module 144, profile module 146, and controller module 148 may be wholly or at least partially incorporated within one or more other modules of the content engine 116, and etc.

In practice, the example video packet 152 may be received by the evaluation module 144. The packet analysis module 154 of the evaluation module 144 may extract and analyze particular tags embedded within the video packet 152. For example, assuming the video packet 152 is associated with "The Notebook," the packet analysis module 154 may determine identify a particular "tag" that specifies one of, for example, content title: The Notebook, showing time: 8-10 PM, leading actress: Rachel McAdams, scheduled commercial start/end times, etc. The evaluation module 144 may then query the profile module 146 and compare extracted information with preference and/or priority information as stored within the priority content module 160. For example, the profile module 146 may include or otherwise specify "Rachel McAdams" within the preference and/or priority information, and the evaluation module 144 may match this information with the particular tag "leading actress: Rachel McAdams" within the video packet 152.

Upon making the "match" in this example scenario, the evaluation module 144 may determine that at a particular user is at least probably or likely interested in movies starring leading actress "Rachel McAdams," the packet selection module 156 of the evaluation module 144 may then select and pass the video packet 152 to the controller module 148. In addition, the control signal module 158 of the evaluation module 144 may select and pass a control signal to the controller module 148. In this example, the control signal may indicate to the controller module 148 that the packet selection module 156 of the evaluation module 144 intends to pass the video packet 152 to the controller module 148. The control signal may further indicate to the controller module 148 whether an automatic channel switch to "The Notebook" is to be performed by the content engine 116, or whether the interface 134 is to be output to television 112. This indication or instruction may be stored within the priority content module 160 based on, or lack of, user input.

For example, referring now additionally to FIG. 1, a user may manipulate the cursor 130 using the pointing device 114 to select an enable button 168 that when selected may indicate to the controller module 148 that an automatic channel switch to particular priority content (e.g., "The Notebook") is to be performed by the content engine 116. Continuing with the above example, the display content module 164 of the controller module 148 may output to the television 112 the particular video packet 152 as display content, effectively tuning the television receiver 110 from the channel associated with the sporting event "Broncos vs. Ravens," to the channel associated with "The Notebook." In contrast, the enable button 168 when deselected or otherwise unselected may indicate to the controller module 148 to retrieve data associated with the interface 134. In this example, the display content module 164 of the controller module 148 may output to the television 112 the interface 134, as well as the tuned content, as the display content, such that the user may continue to watch the "Broncos vs. Ravens," while having the option of watching "the Notebook" if desired. Other embodiments are possible.

As mentioned above, the content engine 116, together with other elements of the example system 100, may be configured to present or expose certain media content to a user based on an interest prediction. In example embodiments, this may be a function of preference and/or priority information as stored within the priority content module 160. Such preference and/or priority information as stored within the priority content module 160 may be continuously updated based on at least one of manual user input and monitored user behavior. For example, the training module 162 of the profile module 146 may periodically or at least intermittently determine user behavior and extrapolate the user behavior into an estimation or prediction regarding user preference with respect to broadcast programming. The estimation or prediction may be quantified as a "ranking" or "priority."

For example, the training module 162 may automatically resolve that every Thursday evening a particular user tunes-in to particular programming appearing on a particular television channel. In this example, the training module 162 may establish or assign a relatively "high" priority to the particular programming as broadcast at the particular date/time, and populate the priority content module 160 with such information. In other words, the content engine 116 may determine is interested in the particular programming. Subsequently, when the particular programming is broadcast, the content module 116 may either perform an automatic channel switch to the particular programming, or output an interface requesting input as to whether the particular user would like to watch the priority content, in a manner such as described above.

In another example, the training module 162 may resolve, by manual input, that every Thursday evening the particular user tunes-in to particular programming appearing on a particular television channel. In this example, and referring now additionally to FIG. 1, a user may manipulate the cursor 130 using the pointing device 114 to select an edit preference button 170 that when selected may indicate to the training module 162 that a user desires to manually enter preference and/or priority information for storage within the priority content module 160. It may be understood that express, manual user input may as to preference and/or priority information may at least initially be more significant and accurate than "learning" based on user behavior. Other embodiments of manual user input are possible as well.

For example, still referring to FIG. 1, and assuming that an automatic channel switch to "The Notebook" has recently been performed by the content engine 116, a user may actuate the second input control 120 to return (e.g., "return to previous channel button") to the sporting event "Broncos vs. Ravens." In this example, it may be inferred by the training module 162 that the movie "The Notebook" is currently of "higher" priority or interest than the sporting event "Broncos vs. Ravens." An automatic channel switch to the "The Notebook" during the sporting event "Broncos vs. Ravens" may be suppressed for the duration of the game. Further details associated with the training module 162 are discussed below in connection with at least FIG. 6.

As mentioned above, a user may manipulate the cursor 130 using the pointing device 114 to select the edit preference button 170 that when selected may indicate to the training module 162 that a user desires to manually enter preference and/or priority information for storage within the priority content module 160. Referring now to FIG. 4, an example priority listing 172 is shown in accordance with the present disclosure. In this example, the priority listing 172 may be presented within the pane 132 on the television 112 following selection of the edit preference button 170. Here, the priority listing 172 displays preference and/or priority information including a rank or ranking of particular programs, where a user may provide manual input to modify or define the rank or ranking of particular programs.

For example, a user may enter and designate, indicated by intermittent lines in FIG. 4, that "New episodes of Futurama" are of primary interest. Subsequently, when the show of "Futurama" is broadcast, the content module 116 may either perform an automatic channel switch to the "Futurama", or output an interface requesting input as to whether the user would like to watch the show "Futurama." In event of a "conflict," such as for example when "News about severe weather" and the show of "Futurama" are concurrently broadcast, the content module 116 may select the content of greater priority and either perform an automatic channel switch to the "Futurama", or output an interface requesting input as to whether the user would like to watch the show "Futurama." Additionally, a user may "swap" positions of rank or ranking of particular programs within the priority listing 172. For example, a user may determine at some point that "News about severe weather" is of greater importance or priority than the show "Futurama," as indicated by the "swap" arrow in FIG. 4. Other embodiments and/or implementations of the priority listing 172 are possible as well.

For example, a "preferred" action may be included for each item in the priority listing 172 to identify what to do when a particular item is identified. An example of a "preferred" action may include "auto switch," "ask for switch," "simple pop-up," "pre-tune," "turn on TV," and etc. In another example, an option may be added to the priority listing 172 to add a new manual priority with listing of potential field types such as, for example, genre, time, actor, and etc.). In another example, an option may be added to the priority listing 172 to delete a listing. An option may be added to the priority listing 172 to edit an existing entry. For example, a user might want to change the time of cartoons to "8:00 AM." In another example, an option may be added to the priority listing 172 to add a flag for each item to identify whether the item was system created or user created. Such an implementation may help a user to sort his/her selections versus system actions. In another example, an option may be added to the priority listing 172 to access a "Priority Settings" menu, where a user may select preferences such as, for example, default settings, maximum listings, and etc. Still other embodiments and/or implementations of the priority listing 172 are possible as well.

Figure 5:
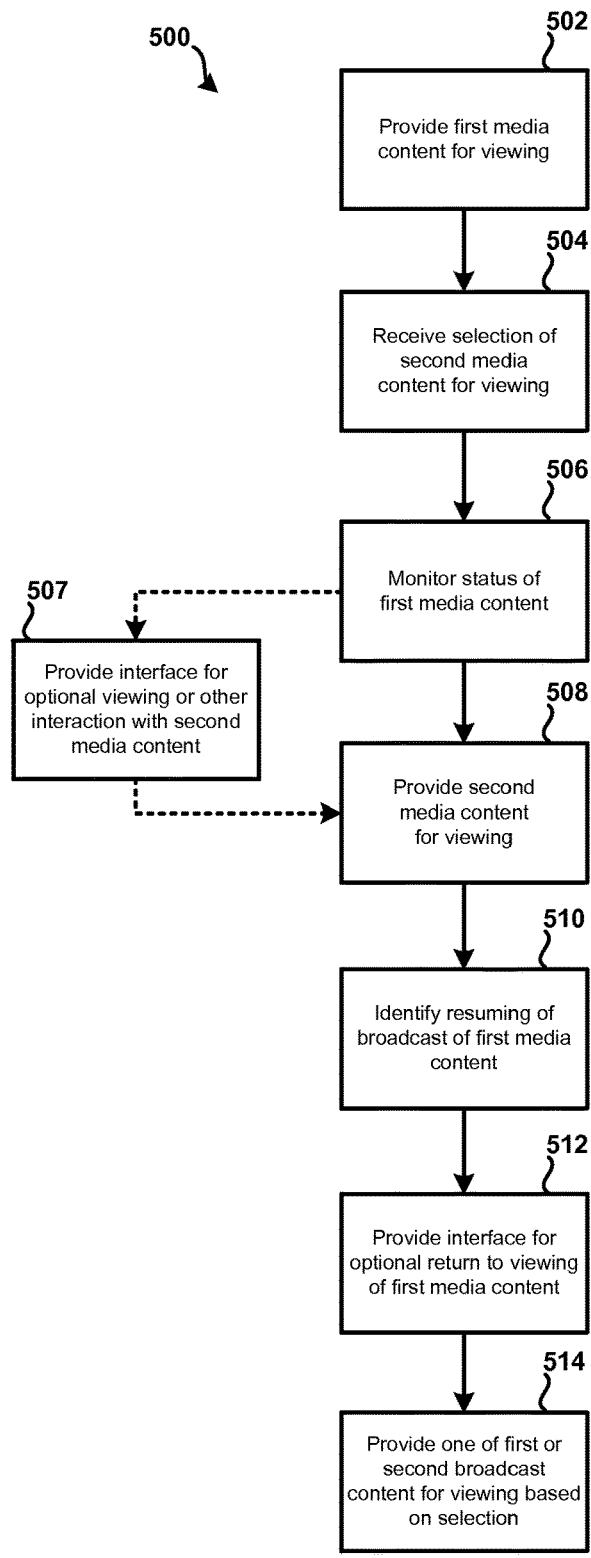
FIG. 5 shows an example method for providing a recommendation of media content.

Referring now to FIG. 5, an example method 500 for providing a recommendation of media content is shown in accordance with the principles of the present disclosure. The method 500 is described as implemented by or on the television receiver 110 of FIG. 1. However, other embodiments are however possible. For example, one or more modules or steps of the example method 600 may be implemented by one or more of the other respective devices or components within the example system 100 as described above.

At step 502, the television receiver 110 may provide to the television 112 first media content for presentation by the television 112. For example, the television receiver 110 may pass to television 112 audio/video content associated with "The Notebook" for presentation by the television 112. At step 504, the television receiver 110 may receive from the pointing device 114 indication of selection of second media content for presentation by the television 112. For example, the television receiver 110 may receive from the pointing device 114 indication of selection of the "Broncos vs. Ravens" for presentation by the television 112. Other embodiments are possible.

At step 506, the television receiver 110 may, concurrently with providing to the television 112 the second media content for presentation by the television 112, monitor status of the first media content. For example, a user may have tuned-in to the second media content during a break in broadcast of the first media content and, at step 506, the television receiver 110 may monitor status of the break in broadcast of the first media content. For example, a user may have changed channels to watch "Broncos vs. Ravens" upon a commercial break during broadcast of "The Notebook." At step 506, the television receiver 110 may thus monitor status of the commercial break during broadcast of "The Notebook." Other embodiments are possible.

At step 508, the television receiver 110 may provide to the television 112 the second media content for presentation by the television 112. For example, the television receiver 110 may pass to television 112 audio/video content associated with the "Broncos vs. Ravens" for presentation by the television 112. In some embodiments, process flow may proceed from step 506 to step 507, indicated by intermittent lines in FIG. 5, prior to step 508. At step 507, the television receiver 110 may provide to the television 112 data associated with a user interface to enable optional viewing or other interaction with the second media content. Such an implementation may be beneficial in many respects. In particular, a user may have the ability at this point to pursue many options such as, for example, watching the second media content, setting a recording for the second media content, continued watching of the first media content, setting the second media content as a priority, and etc. In this manner, the user is engaged and has many options other than simply switching to the second media content.

At step 510, the television receiver 110 may identify resuming of broadcast of the first media content. For example, the television receiver 110 may identify one or more tags within one or more commercials of the commercial break during broadcast of "The Notebook," and determine a particular time at which a resuming in broadcast of "The Notebook" is to commence. In some embodiments, this may be identified prior to resuming of broadcast of "The Notebook," such that the television receiver 110 may provide adequate notification to the user prior to resuming of the "The Notebook." Other embodiments are possible.

At step 512, the television receiver 110 may provide to the television 112 data associated with a user interface to enable a timely return to the first media content for presentation by the television 112. For example, the television receiver 110 may pass to television 112 data associated with the interface 134 for presentation by the television 112. In this example, the user may then optionally select, or not, "The Notebook" for immediate viewing on the television 112. For example, at step 514, the television receiver 110 may optionally provide to the television 112 the first media content for presentation by the television 112, based on an optional selection by a user For example, the user may manipulate the cursor 130 using the pointing device 114 to select a confirmation button 136 to select the movie "The Notebook" for immediate viewing on the television 112, or a select a disregard button 138 to decline the option for immediate viewing of the "The Notebook." In event of selection of the confirmation button 136, "The Notebook" may be displayed within the pane 132 for immediate viewing, otherwise the sporting event "Broncos vs. Ravens" may be continued to be displayed.

It is contemplated that example method 500 may be applicable for providing a recommendation of any particular media content type. Example types of media may include advertising media, broadcast media, social media, news media, and the like. Additionally, the recommendation may be of a "cross-media" type where, for example, a first particular media type may correspond to broadcast media, and a second particular media type may correspond to social media, and etc. Still other embodiments are possible.

Figure 6:
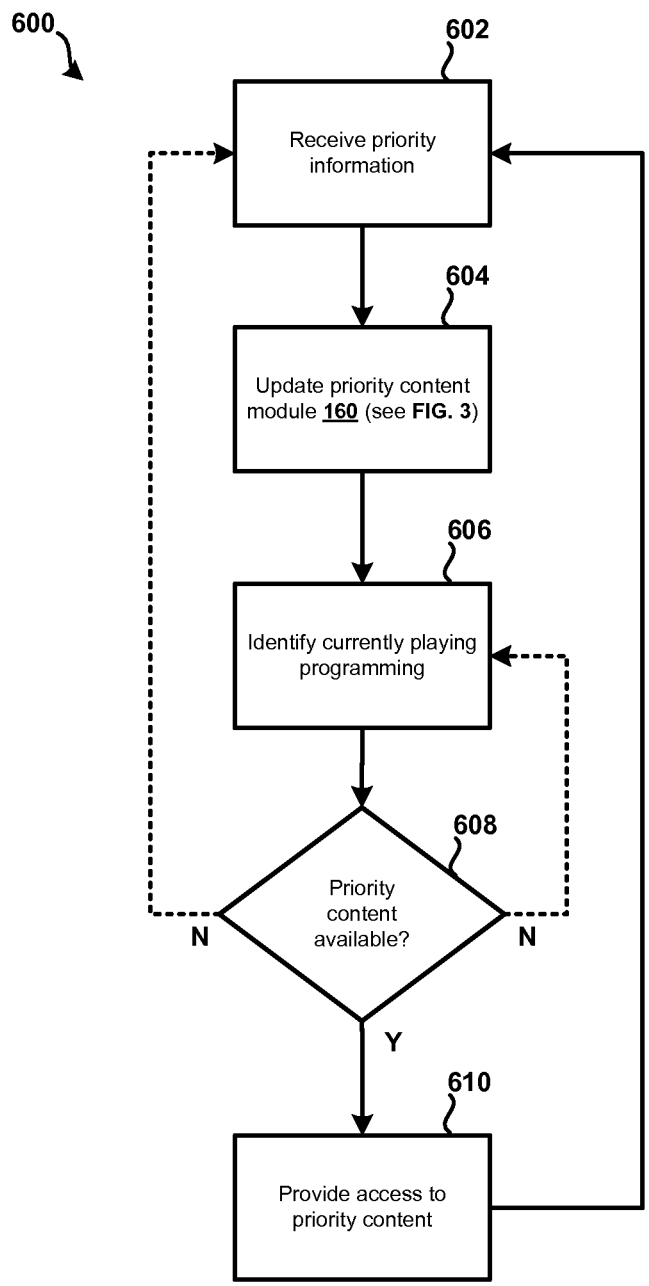
FIG. 6 shows an example method for providing access to priority media content.

Referring now to FIG. 6, an example method 600 for providing access to priority media content is shown in accordance with the principles of the present disclosure. The method 600 is described as implemented by or on the television receiver 110 of FIG. 1. However, other embodiments are however possible. For example, one or more modules or steps of the example method 600 may be implemented by one or more of the other respective devices or components within the example system 100 as described above.

At step 602, the television receiver 110 may receive preference and/or priority information that is associated with a user(s), or an account associated with the user(s). Such an implementation may be constantly occurring. For example, the television receiver 110 may continuously analyze real-time "tags" for every packet in a data stream and make priority decisions. For example, the television receiver 110 may count the number of tags being consumed that "Rachel McAdams" exists in. Upon reaching a certain threshold, the television receiver 110 may update the priority content module 160.

In another example, the television receiver 110 may monitor user behavior with respect to access of broadcast programming, and determine that the television receiver 110 is currently tuned-in, and passing audio/video to the television 112, to an episode of "Futurama," indicating the show "Futurama" is likely or probably of interest to a particular user. In another example, the television receiver 110 may receive via manual input that "New episodes of Futurama" are of primary interest to a particular user. Other embodiments are possible.

At step 604, the television receiver 110 may update the priority content module 160 (see FIG. 3) based on the preference and/or priority information received at step 602. For example, the television receiver 110 may determine that, based upon historical usage information, every Thursday for the past several weeks the television receiver 110 is tuned-in, and passing audio/video to the television 112, to an episode of "Futurama." The television receiver 110 may then assign a particular "ranking" or "priority" to the show "Futurama," and update the priority content module 160 to indicate that this show is likely or probably of importance or priority to a particular user. In another example, the television receiver 110 may assign the show "Futurama" a "highest ranking" or "top priority," and update the priority content module 160 to indicate that this show is of primary importance or priority to a particular user, based on manual input by the particular user. Other embodiments are possible.

At step 606, the television receiver 110 may identify currently "playing" broadcast programming. For example, the television receiver 110 may determine the "Broncos vs. Ravens" is currently being passed/displayed to the television 112. At step 608, the television receiver 110 may make a determination, concurrently with the "playing" broadcast programming, as to whether particular priority content is available for viewing. For example, the television receiver 110 may monitor at least channel "2009," and make a determination that "The Notebook" is currently being broadcast based on an analysis of one or more tags embedded within the broadcast content. The television receiver 110 may then query the priority content module 160 to determine whether a "match" may be made between preference and/or priority within the priority content module 160, and information associated with the one or more tags. Other embodiments are possible.

Upon determining at step 608 that particular priority content is not currently available for viewing, flow may optionally (indicated by intermittent lines in FIG. 6) branch to one of step 602 and step 606. In this manner, the example method 600 may continuously update or "train" the priority content module 160, as well as continuously determine whether broadcast content that is at least likely or certain to be of greater interest than currently playing content is available for viewing. In other words, the example method 600 may continuously present or expose certain programming to a user based on an interest prediction.

Upon determining at step 608 that particular priority content is currently available for viewing, flow may branch to step 610. At step 610, the television receiver 110 may provide access to the particular priority content. For example, the television receiver 110 may implement an automatic channel switch to "The Notebook" from the Broncos vs. Ravens," or output the interface 134 to television 112 such that a user may choose whether or not to switch from the Broncos vs. Ravens" to "The Notebook." Other embodiments are possible.

Further scenarios and beneficial aspects associated with presenting or exposing certain media content to a user based on an interest prediction are possible in accordance with the present disclosure. For example, the television receiver 110 may record a history of recommendations that have been given via the interface 134, along with associated details for each (e.g., channel, event, actor, etc.). This information may then be periodically passed back to the service provider 102 via a feedback channel. Such recommendations may be essentially understood to be a form of organic advertising, so each recommendation could be monetized by an entity or corporation that offers satellite services, and at least designs, develops, and distributes components, such as the television receiver 110, for pay television providers back to an original service provider for advertising a particular event on their service to the consumer.

Further, a station may derive funding from commercials that they include in their video feeds. In general, in order to increase advertisement revenue, more people need to tune-in. One example way to obtain viewership may include having interesting programs that people want to watch. However, including tags such as described throughout the present disclosure may be an alternative means to drive people to a particular station/programming. In this manner, an entity or corporation that offers satellite services, for example, may charge content providers for the opportunity to include tags in their stream.

In still other examples, the television receiver 110 may "create" an "interest vacuum" by maintaining a "blacklist." For example, and similar to how the priority listing 172 may identify items that customer may be interested in watching, the "blacklist" may identify items that a customer is not interested in watching. For example, a particular customer may dislike a particular actor. In this example, the actor's name may be populated within the "blacklist." If the particular actor appeared in a show that the customer was watching, it would identify this as an "interest vacuum,"

similar to a commercial, and at least attempt to switch to a program with a "higher priority." Such a "blacklist" may be user-defined.

Figure 7:
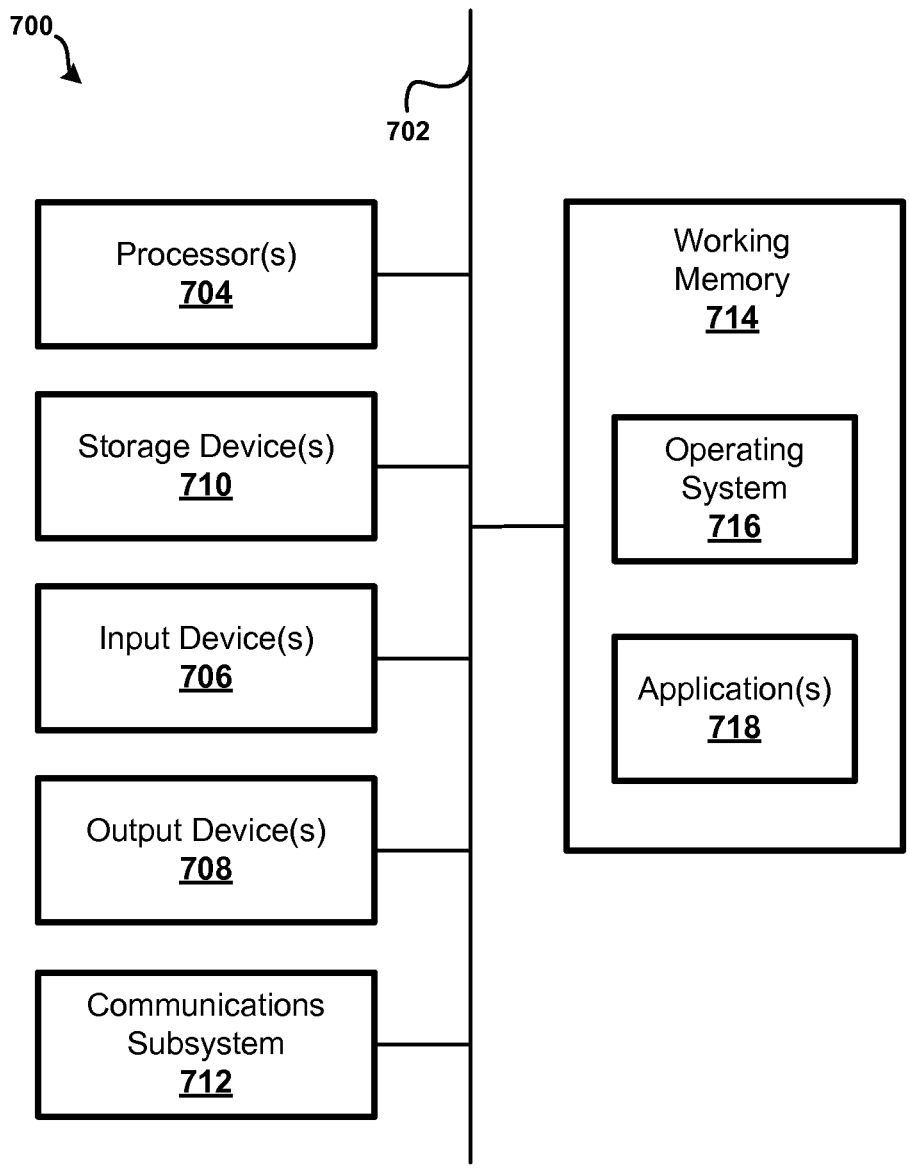
FIG. 7 shows an example computing system or device

Referring now to FIG. 7, an embodiment of an example computer system or device 700 is shown. An example of a computer system or device includes an enterprise server, blade server, desktop computer, laptop computer, personal data assistant, smartphone, gaming console, set-top-box, and any other type machine for performing calculations. The computer system 700 may be wholly or at least partially incorporated as part of previously-described computing devices, such as at least the television receiver 110, the television 112, and the pointing device 114 of FIG. 1. The example computer device 700 may be configured to perform and/or include instructions that, when executed, cause the computer system 700 to perform the method of FIGS. 5-6, and or generate or otherwise instantiate the interface 134 of FIG. 1. FIG. 7 is intended only to provide a generalized illustration of various components, any or all of which may be utilized as appropriate. FIG. 7, therefore, broadly illustrates how individual system elements may be implemented in a relatively separated or relatively more integrated manner.

The computer device 700 is shown comprising hardware elements that can be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which can include without limitation a remote control, a mouse, a keyboard, and/or the like; and one or more output devices 708, which can include without limitation a presentation device (e.g., television), a printer, and/or the like.

The computer system 700 may further include (and/or be in communication with) one or more non-transitory storage devices 710, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 700 might also include a communications subsystem 712, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which can include a RAM or ROM device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the invention. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 710. Volatile media include, without limitation, dynamic memory, such as the working memory 714.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing access to particular media content, comprising:
   receiving, by a television receiver, a plurality of concurrent media content from a service provider, including at least a first media content and a second media content, wherein each of the plurality of media content comprises a stream or sequence of video packets including one or more real-time metadata tags embedded within the video packets such that the real-time metadata tags are not output when the media content is output by an output device, and wherein each real-time metadata tag is associated with a specific time period during the media content;
   outputting, by a television receiver, the first media content for presentation by a display device;
   monitoring the stream or sequence of video packets of the second media content, and extracting, by the television receiver, one or more real-time metadata tags from the video packets of the second media content, during the output of the first media content;
   retrieving, by the television receiver, a priority listing associated with a first user of the television receiver;
   comparing, by the television receiver, the real-time metadata tags extracted from the video packets of the second media content to the priority listing associated with the first user;
   determining, by the television receiver, based on the comparison of the real-time metadata tags extracted from the video packets of the second media content to the priority listing associated with the first user, whether the second media content has a priority greater than the first media content; and
   providing access, by the television receiver, to the second media content for presentation by the display device, in place of the first media content when the second media content has greater priority than the first media content.

2. The method of claim 1, wherein providing access to the second media content in place of the first media content comprises:
   outputting an interface identifying the second media content, while the first media content is being displayed on the display device;
   receiving, via the interface, indication of selection of an accept access option; and
   outputting the second media content for presentation by the display device, in response to the selection of the accept access option.

3. The method of claim 2, further comprising modifying priority of at least the second media content in response to receiving indication of selection of the accept access option.

4. The method of claim 1, wherein providing access to the second media content in place of the first media content comprises:
outputting an interface identifying the second media content, while the first media content is being displayed on the display device;
receiving, via the interface, indication of selection of a refuse access option; and
continuing outputting the first media content for presentation by the display device, in response to the selection of the refuse access option.

5. The method of claim 4, further comprising modifying the priority of the second media content in response to receiving indication of selection of the refuse access option.

6. A computing device, comprising:
a processing unit; and
a system memory connected to the processing unit, the system memory including instructions that, when executed by the processing unit, cause the processing unit to implement at least one module to provide access to particular media content, the at least one module configured to:
receive a plurality of concurrent media content from a service provider, including at least a first media content and a second media content, wherein each of the plurality of media content comprises a stream or sequence of video packets including one or more real-time metadata tags embedded within the video packets such that the real-time metadata tags are not output when the media content is output by an output device, and wherein each real-time metadata tag is associated with a specific time period during the media content;
output the first media content for presentation by a display device;
monitor the stream or sequence of video packets of the second media content, and extract one or more real-time metadata tags from the video packets of the second media content, during the output of the first media content;
retrieve a priority listing associated with a first user of the computing device;
compare the real-time metadata tags extracted from the video packets of the second media content to the priority listing associated with the first user;
determine, based on the comparison of the real-time metadata tags extracted from the video packets of the second media content to the priority listing associated with the first user, whether the second media content has a priority greater than the first media content; and
provide access to the second media content for presentation by the display device in place of the first media content when the second media content has greater priority than the first media content.

7. The computing device of claim 6, wherein the at least one module is further configured to:
modify priority of the first media content, and the second media content, based on and in response to receiving an indication of selection of an accept access option or a refuse access option.

8. The method of claim 1, further comprising:
tracking, by the television receiver, the viewing habits of the first user over a period of time, prior to receiving the first media content and the second media content from the service provider; and
generating and storing, by the television receiver, the priority listing associated with the first user, based on the tracking of the viewing habits of the first user over the period of time.

9. The method of claim 8, further comprising:
tracking, by the television receiver, the viewing habits of a second user over the period of time; and
generating and storing, by the television receiver, a second priority listing associated with the second user, based on the tracking of the viewing habits of the second user over the period of time, wherein the television receiver stores a plurality of separate priority listings corresponding to different users.

10. The method of claim 1, further comprising:
receiving, by the television receiver, user input from the first user identifying a set of characteristics of media content; and
generating and storing, by the television receiver, the priority listing associated with the first user, based on the set of characteristics of media content received from the first user.

11. The method of claim 1, further comprising:
retrieving a blacklist of terms associated with the first user, wherein the blacklist of terms is separate from the priority listing associated with the first user; and
comparing the real-time metadata tags extracted from the video packets of the second media content to the blacklist of terms associated with the first user,
wherein the determination of whether the second media content has a priority greater than the first media content is further based on the comparison of the real-time metadata tags extracted from the video packets of the second media content to the blacklist of terms associated with the first user.

12. The method of claim 1, wherein the first media content is of a first content type, and wherein the second media content is of second content type different from the first media type.

13. The computing device of claim 6, wherein the at least one module is further configured to:
track the viewing habits of the first user over a period of time, prior to receiving the first media content and the second media content from the service provider; and
generate and store the priority listing associated with the first user, based on the tracking of the viewing habits of the first user over the period of time.

14. The computing device of claim 13, wherein the at least one module is further configured to:
track the viewing habits of a second user over the period of time; and
generate and store a second priority listing associated with the second user, based on the tracking of the viewing habits of the second user over the period of time, wherein the computing device stores a plurality of separate priority listings corresponding to different users.

15. The computing device of claim 6, wherein the at least one module is further configured to:
receive user input from the first user identifying a set of characteristics of media content; and
generate and store the priority listing associated with the first user, based on the set of characteristics of media content received from the first user.

16. The computing device of claim 6, wherein the at least one module is further configured to:
- retrieve a blacklist of terms associated with the first user, wherein the blacklist of terms is separate from the priority listing associated with the first user; and
- compare the real-time metadata tags extracted from the video packets of the second media content to the blacklist of terms associated with the first user,
- wherein the determination of whether the second media content has a priority greater than the first media content is further based on the comparison of the real-time metadata tags extracted from the video packets of the second media content to the blacklist of terms associated with the first user.

17. The method of claim 1, wherein each of the one or more real-time metadata tags extracted from the video packets of the second media content includes:
- one or more keywords relating to the broadcast content of the second media content; and
- a time range within the broadcast of the second media content during which the one or more keywords apply.

18. The method of claim 1, wherein monitoring the stream or sequence of video packets of the second media content and extracting the real-time metadata tags comprises:
- analyzing every video packet in the stream or sequence of video packets of the second media content, to detect the presences of real-time metadata tags;
- counting the number of real-time metadata tags that contain a particular keyword within a plurality of video packets;
- comparing the number of real-time metadata tags that contain the particular keyword to a predetermined threshold; and
- in response to determining that the number of real-time metadata tags that contain the particular keyword exceeds the predetermined threshold, comparing the particular keyword to the priority listing associated with the first user.

19. The method of claim 1, wherein providing access to the second media content for presentation by the display device comprises:
- retrieving, for a first real-time metadata tag extracted from the video packets of the second media content, a preferred action associated with the first real-time metadata tag from the priority table, wherein the priority table stores a plurality of different preferred actions associated with different real-time metadata tags; and
- determining whether to output an interactive user interface to allow a user selection of the second media content, or whether to automatically output the second media content for presentation by the display device without receiving a user selection of the second media content, based on the preferred action associated with the extracted first real-time metadata tag.

20. The method of claim 19, wherein the plurality of different preferred actions associated with different real-time metadata tags stored in the priority table includes:
- a first preferred action to automatically switch the channel, associated with one or more real-time metadata tags stored in the priority table;
- a second preferred action to display an interactive user interface to allow a user to switch the channel, associated with one or more real-time metadata tags stored in the priority table; and
- a third preferred action to turn on the output device, associated with one or more real-time metadata tags stored in the priority table.

* * * * *